Dec. 19, 1967     B. J. PERRY, JR     3,358,386
CURING APPARATUS FOR PRESS-FREE GARMENTS AND THE LIKE
Filed Sept. 29, 1965     2 Sheets-Sheet 1

INVENTOR
BRYAN J. PERRY JR.
BY
ATTORNEY

Dec. 19, 1967  B. J. PERRY, JR  3,358,386
CURING APPARATUS FOR PRESS-FREE GARMENTS AND THE LIKE
Filed Sept. 29, 1965  2 Sheets-Sheet 2

INVENTOR
BRYAN J. PERRY JR.

BY  B.P. Fishburne, Jr.
ATTORNEY

United States Patent Office 3,358,386
Patented Dec. 19, 1967

3,358,386
CURING APPARATUS FOR PRESS-FREE
GARMENTS AND THE LIKE
Bryan J. Perry, Jr., Greenville, S.C., assignor to Kitchen & Perry, Inc., Greenville, S.C., a corporation of South Carolina
Filed Sept. 29, 1965, Ser. No. 491,216
2 Claims. (Cl. 34—208)

ABSTRACT OF THE DISCLOSURE

An elevated oven or curing chamber having a bottom opening through which suspended garments may enter and leave the curing chamber while traveling on an endless moving conveyor. A blower beneath the curing chamber receives air from a heating chamber and delivers it upwardly through diffusers which communicate with the bottom of the curing chamber. Additional diffusers and a return air passage at the top of the curing chamber direct the return air back to the heating chamber in a continuous operating cycle.

---

The present invention relates to a curing oven, particularly for use in curing press-free garments of the type described in United States Patent 2,974,432, issued Mar. 14, 1961 to William K. Warnock et al.

The main objective of the invention is to improve upon the curing ovens normally employed in the industry in a number of respects. Ovens presently used for curing press-free garments are generally of two types. One type is the batch type, where an oven door is opened and a load of garments is rolled in on a rack, the door is closed for the time cycle in the oven, the door is reopened and the garments are removed and another load introduced into the oven. A second type of conventional oven is the open-end type conveyer oven which utilizes a moving conveyer system to provide a continuous movement of garments into and out of the curing oven.

The first-mentioned batch type curing oven has obvious disadvantages including increased labor and inconvenience in handling each separate load of garments. Also, the capacity of the oven is less and the processing is slower. The open-end type conveyer oven mentioned secondly above allows a continuous flow of garments into and out of the oven but also presents difficulties. There is a tendency for hot air to escape through the open end of the oven into the surrounding factory area; consequently, a suitable exhaust system of high capacity must be installed to prevent this escape of hot air. In the conventional conveyer oven, there is no ready means to control the inflow of cold air or the outflow of hot air through the open end and it is difficult to achieve a uniform temperature throughout the work chamber. This in turn necessitates the use of much longer ovens than are desirable for good economy and space-saving.

The oven of the present invention successfully overcomes the above deficiencies of conventional ovens heretofore employed for similar purposes. More particularly, the invention allows the use of a conveyer type oven which is much shorter than conventional types and which requires only a minimum of exhaust facilities to effect necessary safety. Furthermore, the invention oven is capable of maintaining a very uniform temperature in the curing chamber with no tendency for the hot air to escape into the surrounding factory area or for cold air to flow into the curing chamber.

The invention garment curing oven is characterized by a bottom opening leading into the curing chamber near one end thereof and through which the garments enter and leave the oven on a suitable conveyer system. The arrangement produces a natural locking or trapping of heated air in the oven chamber, thus eliminating the requirements for exhaust except to the degree required for safety. The oven can be much shorter in overall length, as stated, and an even temperature is more easily obtained. The invention also utilizes a novel organization of grills or diffusers in the air flow system to assure the proper volume and direction of air flow and to eliminate hot and cold spots in the curing chamber.

Other objects and advantages of the invention will be apparent during the course of the following detailed description.

In the accompanying drawings forming a part of this application and in which like numerals are employed to designate like parts throughout the same, FIGURE 1 is a vertical longitudinal sectional view, partly diagrammatic and partly in elevation, of a garment curing oven embodying the present invention; taken on line 1—1 of FIG. 2;

Figure 1:
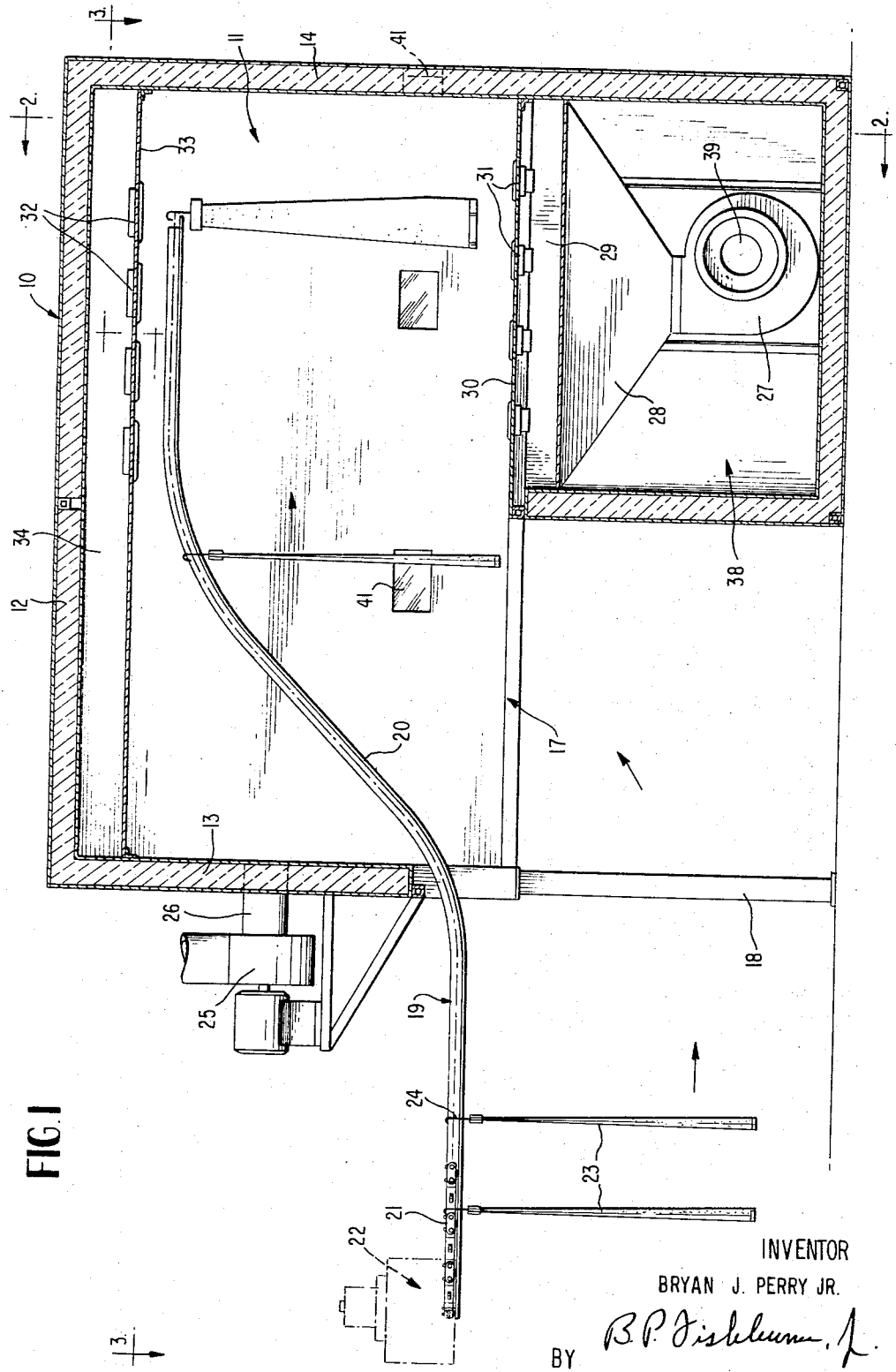

In the drawings, wherein for the purpose of illustration is shown a preferred embodiment of the invention, the numeral 10 designates a somewhat elongated rectangular garment curing oven in its entirety having an elevated main curing chamber 11 bounded at its top and on four sides by heat-insulating walls 12, 13, 14, 15 and 16, as shown in the drawings. The construction of the oven walls and its supporting framework may be entirely conventional and in accordance with known materials and construction methods.

The main curing chamber 11 has a bottom opening 17 at one end thereof and constitutes an important feature of the invention to be fully described. The end of the oven adjacent the opening 17 is supported by a suitable leg structure 18, as shown in FIGURE 1 so that there is a substantially unobstructed path into and out of the elevated curing chamber 11.

In order to convey garments continuously and in large numbers and at the proper speed, into, through and out of the chamber 11, a suitable conventional conveyer apparatus 19 is employed. Various types of conveyers may be utilized including chain, cable or rod conveyers. For purposes of illustration, an endless chain conveyer is illustrated having an endless loop track 20 for the support and guidance of a conveyer chain 21, which chain is constructed so that it can readily negotiate the curves of the track in compound planes. The chain 21 is powered by a suitable drive head 22 shown in broken lines diagrammatically in the drawings. Conventional speed and time cycle controls are employed with the conveyer apparatus. Garments 23 to be processed are freely suspended from the conveyer chain 21 by hangers 24, as shown, and these garments travel with the conveyer chain from a point outside of the oven, through the bottom opening 17, and then upwardly on the inclined portion of the conveyer into the central area of the curing chamber 11 and after circuiting this chamber at the required speed, the garments descend therefrom and leave the chamber 11 fully processed through the same bottom opening 17.

Preferably at the end of the chamber 11 above the opening 17, but not necessarily at this position, there is provided on the end wall 13 a suitable blower 25 communicating through a duct 26 with the chamber 11 to exhaust hot air therefrom. As previously stated, exhaust requirements are minimized in the invention oven in view of the elevated curing chamber 11 having the bottom opening, which construction tends naturally to trap hot air and preclude the escape thereof. Sufficient exhaust capacity is, however, provided at a convenient point on the oven to maintain adequate safety by preventing the oven temperature from becoming excessively hot.

It might also be mentioned here that the supporting means for the conveyor apparatus 19, both inside and outside of the oven, may be conventional and such supporting means has been eliminated from the drawings for the sake of simplicity.

Beneath the oven curing chamber, near the rear end thereof and toward the side wall 15, is a sufficiently high capacity air circulating blower 27 having an upwardly directed divergent outlet nozzle 28, communicating with a relatively shallow horizontal passage or chamber 29 immediately below the closed end portion of curing chamber 11. The top wall of chamber 29 indicated at 30 has mounted therein commercially available air diffusers 31 of the type through which the flow of air may be adjusted in all forward directions. Additionally, the volume of air flowing through each diffuser 31 is adjustable in a conventional manner. By the use of these air diffusers, hot or cold spots peculiar to each oven and located through trial and error may be minimized or eliminated. Also, the use of the air diffusers or grills 31 affords a simple method of regulating both the volume and direction of air flow through the oven, initially and throughout the entire life of the apparatus.

In furtherance of this objective, additional air diffusers 32 are located in the top wall or partition 33 of chamber 11, toward the closed end thereof and above the diffusers 31.

Figure 3:
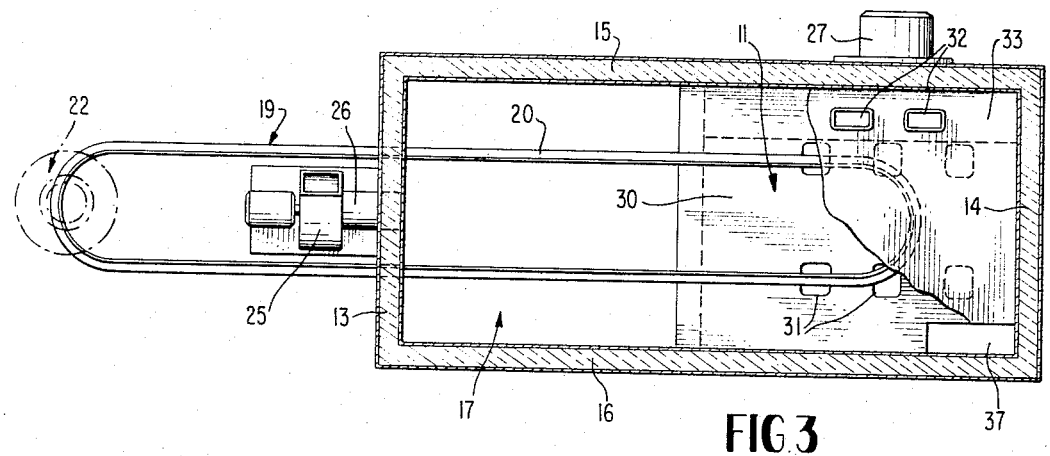
FIGURE 3 is a horizontal section taken on line 3—3 of FIGURE 1.
Figure 2:
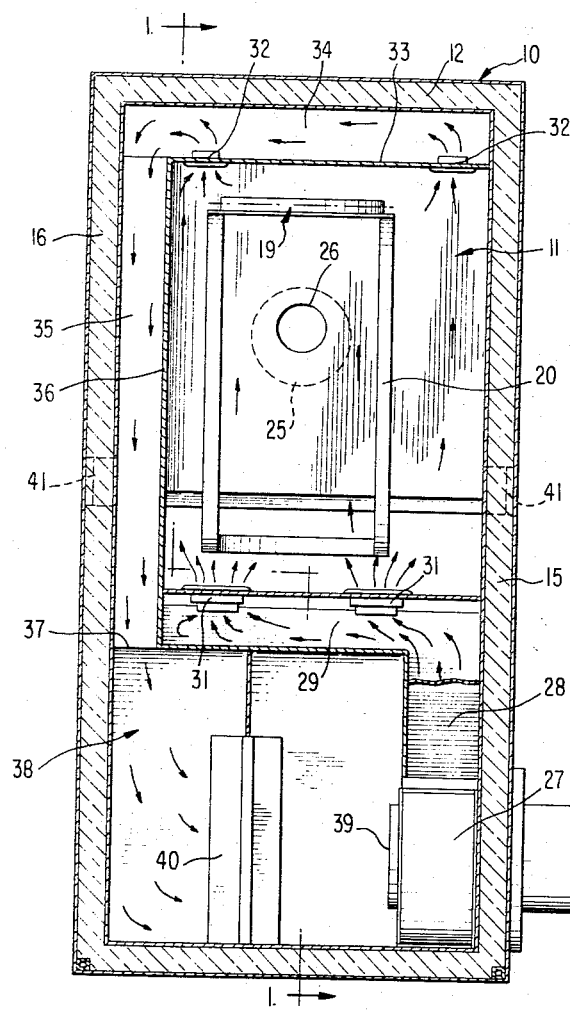
FIGURE 2 is a transverse vertical section taken on line 2—2 of FIGURE 1.

As best illustrated in FIGURE 2, the overhead diffusers 32 communicate with a horizontal relatively shallow return chamber 34, leading into a vertical return passage 35, separated from the curing chamber 11 by an internal wall 36. The lower end of return passage 35 communicates directly with an opening 37 leading into the top of an air heating chamber 38, which in turn is in communication with the inlet 39 of the blower 27. Within the heating chamber 38 is a suitable air heater 40 which may be electric, gas, oil or steam-operated, or substantially any other known type. The top of heating chamber 38 is separated from the curing chamber 11 by the horizontal walls of passage 29, as shown clearly in FIGURE 2. The air return opening 37 is located at one corner of the oven structure, as best shown in FIGURE 3. As may now be seen, the described arrangement permits a continuous forced circulation of heated air from the chamber 38 and blower 27 through the passage 29 and diffusers 31 to the curing chamber 11, and upwardly through this chamber to the diffusers 32 and thence to the return passages 34 and 35, completing an air flow circuit, as shown by the arrows in FIGURE 2.

FIGURE 1 of the drawings shows clearly that the side walls and bottom wall of the heating chamber 38 are also preferably heat-insulated. Another feature of the construction resides in the provision of a suitable number of inspection portholes 41 in the side walls of the curing chamber, as indicated. It is thought that the physical construction of the apparatus should now be adequately clear from the drawings taken in light of the foregoing detailed description.

During operation, the conveyer apparatus 19 causes the particular garments 23 to travel continuously into, through and out of the curing chamber 11 at the proper speed. While this is occurring, air heated in the chamber 38 by the heating unit 40 is caused to flow continuously through the curing chamber 11 in the manner previously described in detail. The exhaust blower 25 may be operated either continuously or at intervals to aid in maintaining the proper constant oven curing temperature in the chamber 11.

A very important feature of the operation is the manner in which the garments on the inclined portion of the conveyer apparatus enter and leave the curing chamber 11 without the escape of hot air therefrom or the entrance of cool air into the chamber. The hot air naturally tends to rise and is therefore trapped in the chamber 11 and the colder air tends to settle and will exit through the bottom opening 17. This is an ideal arrangement for maintaining proper conditions in the curing chamber without the necessity for doors, valves or the like. Also, as explained, the oven can be constructed much shorter in length than the usual open-end type conveyer oven where there is no means to prevent some degree of mixing of the warm and cold air. It is believed that the advantages of the construction and its operation will now be readily apparent to those skilled in the art, without the necessity for any further description herein.

While the drawings and description designate the warm air flowing upwardly through the curing chamber, FIGURE 2, the construction and ducting could easily be revised within the scope of the invention to cause the curing air to flow downwardly in curing chamber 11 rather than upwardly, without departing from the basic principle of the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A curing oven particularly for use in processing press-free garments comprising an elevated relatively large main curing chamber having a large bottom opening near one end thereof and including insulated end, side and top walls, an exhaust device connected with said curing chamber on one wall thereof substantially above the elevation of the bottom opening, a heating chamber means below the main curing chamber at the end of the curing chamber remote from the large bottom opening and including a heating element and serving to support the adjacent end portion of the elevated curing chamber and constituting a bottom closure for the end portion of the curing chamber above the heating chamber means, a blower mounted below the main curing chamber adjacent one side wall thereof and having an inlet in communication with the heating chamber means and an upwardly flaring outlet nozzle which is elongated lengthwise of the main curing chamber, a vertically shallow plenum chamber above the outlet nozzle in communication therewith and extending transversely across the bottom of the main curing chamber and substantially for that part of the length of the curing chamber which is above the heating chamber means, plural spaced air diffuser elements connected with the shallow plenum chamber for directing heated air upwardly into the bottom of the main curing chamber at a plurality of points spaced from the large bottom opening, a vertically shallow return air chamber at the top of the main curing chamber and substantially spanning the main curing chamber transversely between the side walls thereof and also longitudinally between the end walls of the main curing chamber, plural spaced air diffuser elements connected in said return air chamber and communicating with the top of the main curing chamber, a substantially vertical return air duct leading downwardly from one corner of the shallow return air chamber and opening into the top of the heating chamber means adjacent one corner thereof and being separated from communication with the main curing chamber and said shallow plenum chamber, and an endless conveyor structure for press-free garments including an elevated substantially horizontal loop within that portion of the main curing chamber above the heating chamber means, an inclined entrance and exit portion in that part of the curing chamber above said large bottom opening and allowing suspended garments to pass freely through the large bottom opening, and another generally horizontal section extending outside of the main curing chamber at one end thereof and being arranged near the elevation of said large bottom opening and allowing the garments to hang freely without contacting the floor which supports the curing oven.

2. A curing oven particularly for use in processing press-free garments comprising an elevated generally rectangular main curing chamber which is elongated in the direction of movement of garments passing into and out of the same, approximately one-half of the bottom of said curing chamber being open and the bottom opening being at a substantial elevation above a floor supporting the oven and said bottom opening being substantially horizontal, an air heating and blowing mechanism beneath the remainder of the bottom area of the curing chamber and including plural upwardly facing air diffusing outlets for directing air into the bottom of the curing chamber, said mechanism forming a substantially horizontal bottom wall for that portion of the curing chamber above said mechanism and longitudinally beyond said bottom opening, means forming a shallow return air chamber at the top of the curing chamber and substantially spanning the curing chamber longitudinally and transversely and including plural air diffusing openings leading from the top of the curing chamber, a downwardly extending return air passage interconnecting the shallow return air chamber and said air heating and blowing mechanism, whereby air may be forced in a continuous circuit through the curing chamber, an exhaust device connected into one side wall of the curing chamber at an elevation substantially above said bottom opening and mechanism, and a conveyor for carrying suspended press-free garments in a continuous procession through the curing chamber, said garments entering and leaving the curing chamber through said bottom opening.

References Cited
UNITED STATES PATENTS

| | | | |
|---|---|---|---|
| 746,768 | 12/1903 | West | 34—207 X |
| 1,251,510 | 1/1918 | Grosvenor | 34—219 X |
| 1,534,499 | 4/1925 | Braemer | 34—196 X |
| 1,761,472 | 6/1930 | Fox | 34—207 |
| 1,768,498 | 6/1930 | Willsea | 34—255 X |
| 2,184,473 | 12/1939 | Scanlan | 34—225 X |
| 2,294,530 | 9/1942 | Wiese | 34—196 X |
| 2,295,475 | 9/1942 | Hurxthal | 34—105 X |
| 2,800,726 | 7/1957 | Koch et al. | 34—208 |
| 3,109,637 | 11/1963 | Taylor | 34—212 X |

FREDERICK L. MATTESON, JR., *Primary Examiner.*
A. D. HERRMANN, *Assistant Examiner.*